US011597341B2

(12) United States Patent
Andres

(10) Patent No.: US 11,597,341 B2
(45) Date of Patent: *Mar. 7, 2023

(54) LOW SEVERITY IMPACT DETECTION SENSOR SYSTEM FOR A VEHICLE

(71) Applicant: Continental Automotive Systems, Inc., Auburn Hills, MI (US)

(72) Inventor: Robert M Andres, Clarkston, MI (US)

(73) Assignee: CONTINENTAL AUTOMOTIVE SYSTEMS, INC., Auburn Hills, MI (US)

( * ) Notice: Subject to any disclaimer, the term of this patent is extended or adjusted under 35 U.S.C. 154(b) by 812 days.

This patent is subject to a terminal disclaimer.

(21) Appl. No.: 16/504,844

(22) Filed: Jul. 8, 2019

(65) Prior Publication Data

US 2021/0009062 A1   Jan. 14, 2021

(51) Int. Cl.
*B60Q 9/00* (2006.01)
*G01S 7/497* (2006.01)
*B60R 21/0136* (2006.01)
*B60R 21/0132* (2006.01)
*G01S 13/86* (2006.01)
*B60W 50/14* (2020.01)
*G01S 7/40* (2006.01)

(52) U.S. Cl.
CPC .......... *B60R 21/0136* (2013.01); *B60Q 9/008* (2013.01); *B60R 21/0132* (2013.01); *B60W 50/14* (2013.01); *G01S 7/40* (2013.01); *G01S 7/497* (2013.01); *G01S 13/865* (2013.01); *G01S 13/867* (2013.01); *B60W 2420/42* (2013.01); *B60W 2420/52* (2013.01); *B60W 2420/54* (2013.01)

(58) Field of Classification Search
CPC . B60R 21/0136; B60R 21/0132; B60Q 9/008; B60W 50/14; B60W 2420/42; B60W 2420/52; B60W 2420/54; G01S 7/40; G01S 7/497; G01S 13/865; G01S 13/867
USPC .......................................................... 701/36
See application file for complete search history.

(56) References Cited

U.S. PATENT DOCUMENTS

| | | | | |
|---|---|---|---|---|
| 6,002,975 A * | 12/1999 | Schiffmann | ......... | B60R 21/0132 340/463 |
| 6,023,664 A * | 2/2000 | Bennet | .................... | G01P 15/18 73/488 |
| 2004/0007859 A1* | 1/2004 | Shields | ............... | B60R 21/0132 280/735 |
| 2004/0182627 A1* | 9/2004 | Bujak | ................. | B60R 21/0132 180/274 |

(Continued)

*Primary Examiner* — Gertrude Arthur Jeanglaude

(57) ABSTRACT

A crash sensor system for a vehicle capable of operating in an autonomous mode includes an electronic control unit (ECU) having a processor circuit. The ECU triggers an occupant restraint system of the vehicle in the event of a severe impact event with the vehicle. Satellite sensors are electrically connected to the ECU and are mounted at the front end, the rear end, the right side and the left side of the vehicle near or on an outer surface thereof to detect low severity impact event with the vehicle that does not cause activation of the occupant restraint system. The processor circuit executes an algorithm to confirm, via data from the plurality of satellite sensors, whether the low severity impact event with the vehicle occurred and if so, the ECU triggers a brake controller and a steering controller to cause the vehicle, while in the autonomous mode, to pull over and stop.

17 Claims, 2 Drawing Sheets

(56) References Cited

U.S. PATENT DOCUMENTS

2021/0001795 A1\* 1/2021 Andres ............... B60R 21/0132

\* cited by examiner

LOW SEVERITY IMPACT DETECTION SENSOR SYSTEM FOR A VEHICLE

FIELD

The invention relates to detecting minor or low severity impact events occurring on a vehicle, and, more particularly, to a vehicle sensor system that detects minor impacts that may occur which do not cause activation of an occupant restraint system of the vehicle.

BACKGROUND

Typically, state law requires that a vehicle be pulled over to the side of the road after an accident has occurred. This is generally a simple procedure when a driver, operating the vehicle, realizes that an accident or an impact to the vehicle has occurred.

Conventional crash sensors are typically used to determine if a severe crash has occurred and to activate an occupant restraint system such as airbags. However, when a vehicle is operating in an autonomous mode and when a minor impact occurs to the vehicle that does not require activation of the occupant restraint system, the vehicle may not be instructed to pull over to the side of the road.

Thus, there is a need to provide a vehicle sensor system that confirms that a minor impact has occurred and if the vehicle is operated in an autonomous mode, the vehicle can be then be instructed to pull over and stop.

SUMMARY

An object of the invention is to fulfill the need referred to above. In accordance with the principles of the present invention, this objective is achieved by providing a sensor system for a vehicle that that can operate in an autonomous mode. The vehicle has a front end, a rear end, a left side and a right side. The system includes an electronic control unit (ECU) having a first accelerometer constructed and arranged to measure longitudinal acceleration of the vehicle during a severe impact event with the vehicle; a second accelerometer constructed and arranged to measure lateral acceleration of the vehicle during a severe impact event with the vehicle; and a processor circuit. The ECU is constructed and arranged to trigger an occupant restraint system of the vehicle in the event of a severe impact event with the vehicle as detected by at least the first and second accelerometers. A plurality of satellite sensors is electrically connected to the ECU and mounted at the front end, the rear end, the right side and the left side of the vehicle near or on an outer surface thereof to detect a minor impact event with the vehicle that does not cause activation of the occupant restraint system. The processor circuit is constructed and arranged to execute an algorithm to confirm, via data from the plurality of satellite sensors, whether the minor impact event with the vehicle occurred.

In accordance with another aspect of the invention, a method detects impact events associated with a vehicle that can operate in an autonomous mode. The vehicle has a front end, a rear end, a left side and a right side. The method mounts an electronic control unit (ECU) in the vehicle. The ECU includes a first accelerometer constructed and arranged to measure longitudinal acceleration of the vehicle during a severe impact event with the vehicle; a second accelerometer constructed and arranged to measure lateral acceleration of the vehicle during a severe impact event with the vehicle; and a processor circuit. The ECU triggers an occupant restraint system of the vehicle in the event of a severe impact event with the vehicle based on data from at least the first and second accelerometers. The method provides a plurality satellite sensors electrically connected to the ECU and disposed at the front end, the rear end, the right side and the left side of the vehicle near or on an outer surface thereof to detect a minor impact event with the vehicle that does not cause activation of the occupant restraint system. The method employs the processor circuit to confirm, based on data from the plurality of satellite sensors, whether the low severity impact event with the vehicle occurred.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF EXEMPLARY EMBODIMENTS

Figure 1:
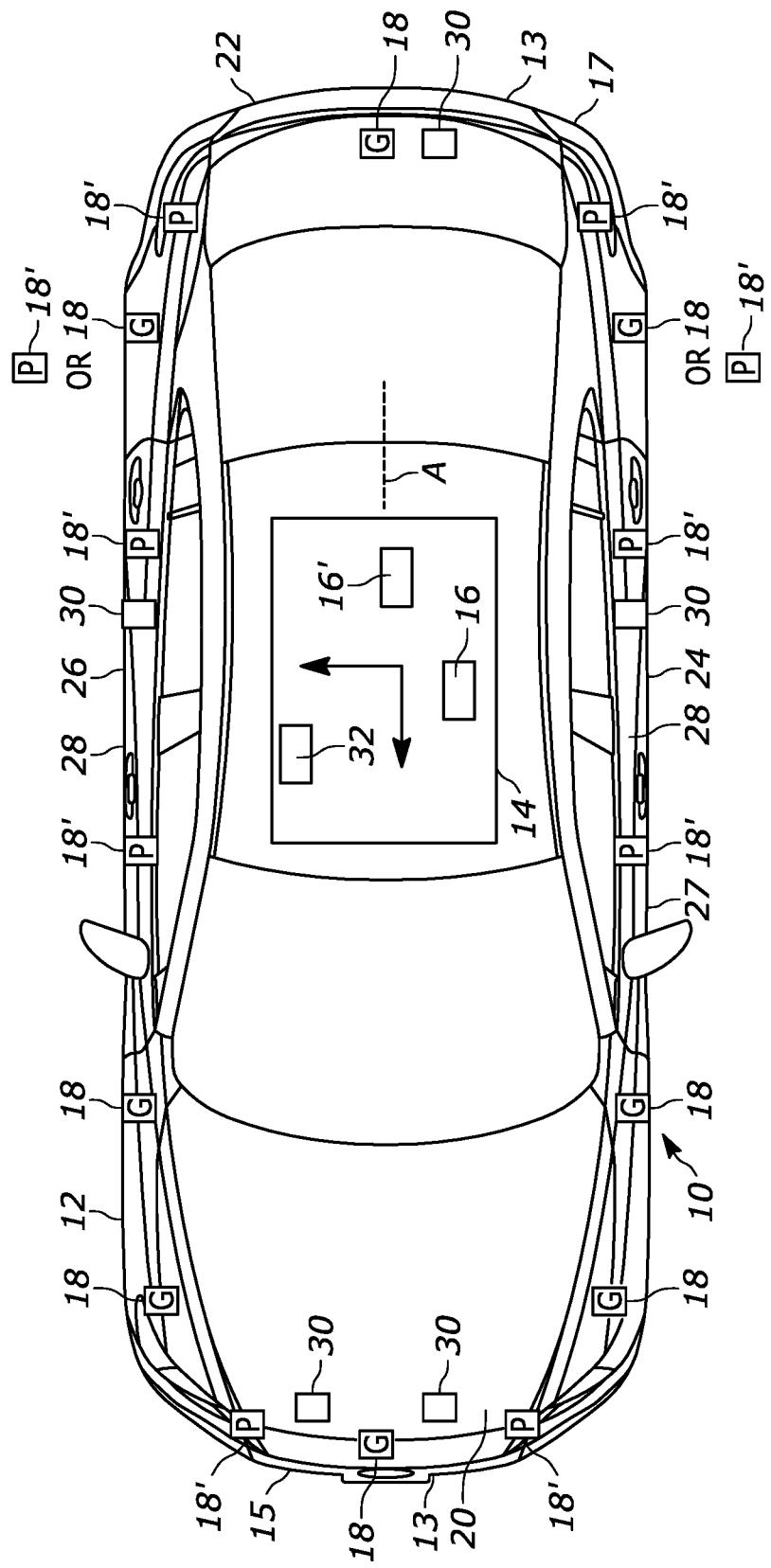
FIG. 1 is schematic view of a crash sensor system, for low severity impact detection of a vehicle, provided in accordance with an embodiment of the invention.

With reference to FIG. 1, a sensor system is shown, generally indicated at 10, for low severity impact detection of a vehicle 12 that can operate in an autonomous mode. The system 10 includes a main electronic control unit (ECU) 14 of a passive safety restraint system that is typically located in the passenger compartment of the vehicle 12 on the floor between the two front seats, typically along a longitudinal axis A of the vehicle 12. This main ECU 14 contains accelerometers 16, 16' orientated to measure the respective longitudinal and lateral acceleration of the vehicle 12 during severe impact events with the vehicle 12 (e.g. crash events). Thus, the sensors 16, 16' determine a change in velocity of the vehicle 12 due to a severe impact with the vehicle.

The system 10 also preferably includes a conventional pressure tube sensor 13 in the front bumper 15 and in the rear bumper 17 that are electrically connected with the ECU 14. The data from the pressure tube sensors 13 along with the data from sensors 16, 16' is used to trigger a pedestrian protection system 19 (FIG. 2) during certain pedestrian impact events with the vehicle.

Figure 2:
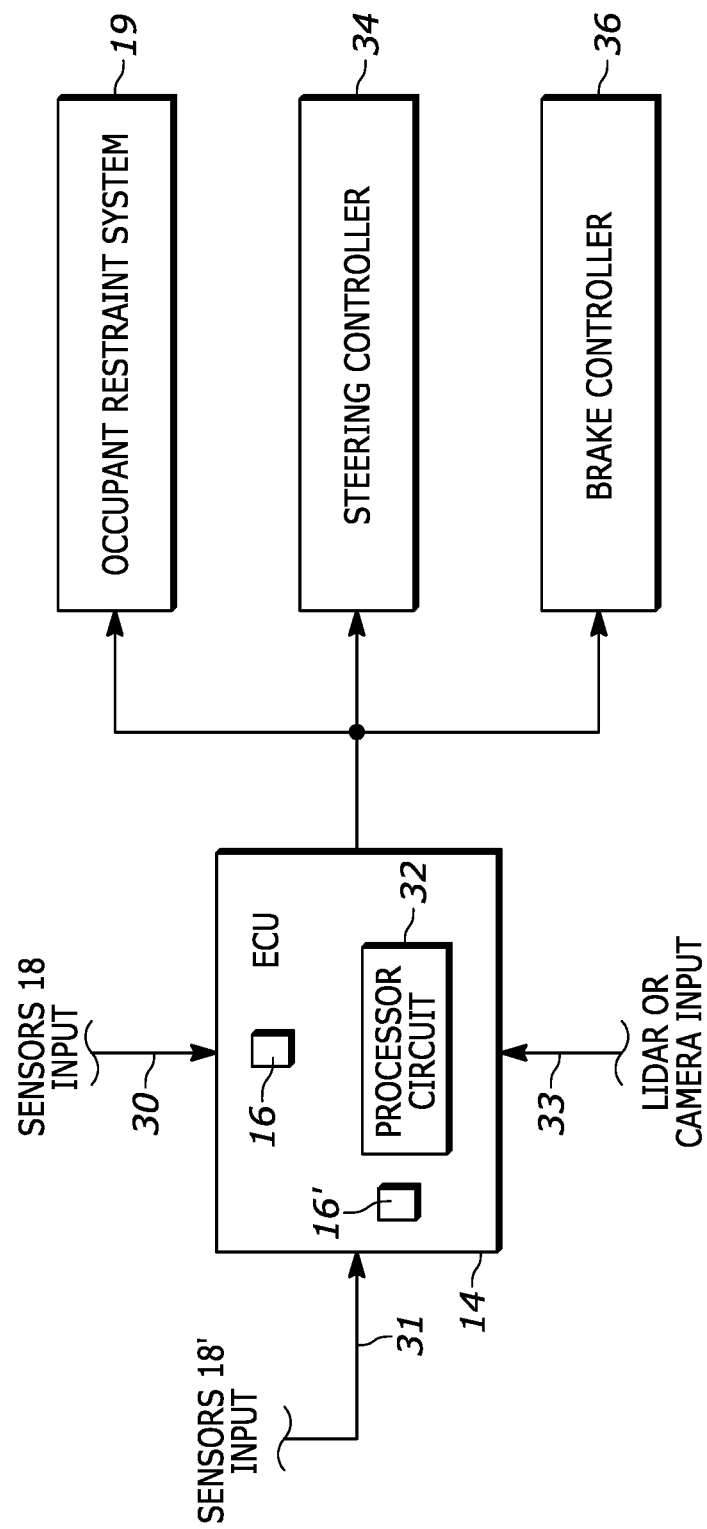
FIG. 2 is schematic illustration of the electronic control unit of the system of FIG. 1, communicating with vehicle controllers in accordance with an embodiment.

Since there is a need to confirm the occurrence of a low severity impact or very minor impacts with the vehicle that do not trigger the occupant restraint system 19, in addition to the accelerometers 16, 16' in the main ECU 14, and the pressure tube sensors 13, the system 10 further includes a plurality of satellite sensors 18, 18'. The sensors 18, 18' are located on the vehicle 12 at various locations substantially about the entire periphery thereof, including the front end 20, rear end 22, left side 24, and right side 26 of the vehicle 12. The sensors 18 are labeled G and are accelerometers mounted on the outer surface 27 of the vehicle 12. The sensors 18' are labeled P and are pressure sensors 18' mounted in vehicle cavities such as the doors 28 near the outer surface 27. Thus, pressure sensors can be used whenever a cavity in the vehicle is available to mount the sensor. Each of the sensors 18, 18' is electrically connected to the ECU 14 via wiring 30, 31, respectively (FIG. 2). Thus, the sensors 18, 18' are mounted close to the outer surface of the vehicle to allow for a greater sensitivity to minor impacts. In the embodiment, sensors 18 are provided at the ends of each pressure tube sensor 13 to extend front end and rear end coverage. Instead of accelerometers or pressure sensors, the sensors 18 and 18' could include sound sensors or acoustic wave sensors mounted on the outer surface 27 that can determine a low severity impact event with the vehicle due to a change in acoustic or structural sound. The system 10, using data from 18, 18', confirms via an algorithm executed by a processor circuit 32 in the ECU 14 that the low severity impact event occurred. The sensors 18, 18' do not discriminate the severity of the impact, but they only confirm that low severity impact event had occurred and the general location of the impact on the vehicle.

The system 10 further preferably includes Advanced Driver Assistance System (ADAS) sensors 30 such as cameras and/or LIDAR sensors electrically coupled to the ECU 14 via wiring 33. The cameras or LIDAR sensors 30 identify objects that are coming in close proximity to the vehicle 12 and on a path where contact with the vehicle is expected. The system 10, using sensors 18, 18', confirms via an algorithm executed by a processor circuit 32 in the ECU 14 that the low severity impact event expected by the LIDAR or camera had actually occurred. It is noted that the algorithm executed by the processor circuit 32 can also use data from the sensors 16, 16', and 13 along with data from the satellite sensors 18, 18' to confirm if the low severity impact event with the vehicle occurred.

With reference to FIG. 2, once the system 10 determines that a low severity impact event with the vehicle 12 had occurred, if the vehicle 12 is in an autonomous mode, the processor circuit 32 can determine whether to signal a steering controller 34 and a brake controller 36 to cause the vehicle 12 to pull over to the side of the road and stop, even though the occupant restraint system 19 is not triggered.

It is noted that the pressure tube sensors 13 may not be employed in all vehicles, so in that case, additional satellite sensors 18 and/or 18' can be employed near or on the front and rear bumpers.

As defined herein, a severe impact event with the vehicle is defined as an impact that causes triggering of the occupant restraint system 19 and low severity impact event with the vehicle is defined as vehicle contact that does not cause triggering of the occupant restraint system 19.

It is noted that satellite sensors such as accelerometers and/or pressure sensors can also be employed for detecting the severe impact events along with sensors 16, 16'. However, with the system 10, to detect a low severity impact event, the location of the accelerometer satellite sensors 18, and the sensing range thereof is different from satellite sensors used in detecting a severe impact event. For restraint control based on a severe impact event, the acceleration satellite sensors are typically mounted to vehicle structural members that are some distance behind the vehicle's outer surface 27. The sensing range of these sensors is also quite high (+/−240 g to +/−480 g is typical). For low severity impact detection, as noted above, the location of the acceleration satellite sensors 18 is directly on the outer surface 27 of the vehicle. The sensing range of satellite sensors 18 is also reduced, typically to +/−120 g, to ensure more sensitivity and a higher resolution. The sensing range and location of pressure sensors 18' would be the same for both severe impact and low severity impact detection applications.

The operations and algorithms described herein can be implemented as executable code within the ECU 14 having the processor circuit 32 as described, or stored on a stand-alone computer or machine readable non-transitory tangible storage medium that are completed based on execution of the code by a processor circuit implemented using one or more integrated circuits. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a micro-processor circuit (not shown) and implemented using one or more integrated circuits, where execution of executable code stored in an internal memory circuit causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit can be implemented, for example, using a non-volatile memory such as a programmable read only memory (PROM) or an EPROM, and/or a volatile memory such as a DRAM, etc.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A crash sensor system for a vehicle that can operate in an autonomous mode, the vehicle having a front end, a rear end a left side and a right side, the system comprising:
   an electronic control unit (ECU) comprising:
      a first accelerometer constructed and arranged to measure longitudinal acceleration of the vehicle during a severe impact event with the vehicle,
      a second accelerometer constructed and arranged to measure lateral acceleration of the vehicle during a severe impact event with the vehicle, and
      a processor circuit, and
   a LIDAR sensor and/or a camera electrically connected with the ECU and constructed and arranged to identify if an object is coming in close proximity to the vehicle and on a path where low severity impact event with the vehicle is expected,
   wherein the ECU is constructed and arranged to trigger an occupant restraint system of the vehicle in the event of a severe impact event with the vehicle as detected by at least the first and second accelerometers, and a plurality of satellite sensors electrically connected to the ECU and mounted at the front end, the rear end, the right side and the left side of the vehicle near or on an outer surface thereof to detect low severity impact event with the vehicle that does not cause activation of the occupant restraint system, wherein the processor circuit is constructed and arranged to execute an algorithm to confirm, via data from the plurality of satellite sensors, whether the low severity impact event with the vehicle occurred, and wherein the processor circuit is constructed and arranged to execute the algorithm to confirm, if the expected low severity impact event with the vehicle had actually occurred.

2. The system of claim 1, further comprising:
a first pressure tube sensor electrically connected to the ECU and mounted in a bumper at the front end of the vehicle, and
a second pressure tube sensor electrically connected to the ECU and mounted in a bumper at the rear end of the vehicle,
wherein the processor circuit is constructed and arranged to execute the algorithm to confirm, via data from the first and second pressure tube sensors, and the plurality of satellite sensors, if the low severity impact event with the vehicle occurred.

3. The system of claim 1, further comprising:
a brake controller electrically connected with the ECU, and
a steering controller electrically connected with the ECU,
wherein, when the low severity impact event with the vehicle has been confirmed, the ECU is constructed and arranged to trigger the brake controller and the steering controller to cause the vehicle, while in the autonomous mode, to pull over and stop.

4. The system of claim 1, wherein the satellite sensors include accelerometers mounted on the outer surface of the vehicle.

5. The system of claim 1, wherein certain of the satellite sensors are accelerometers and other satellite sensors are pressure sensors.

6. The system of claim 5, wherein the accelerometers are disposed on the front end and on the rear end of the vehicle.

7. The system of claim 5, wherein the pressure sensors are disposed in cavities in at least the left side and the right side of the vehicle.

8. The system of claim 1, wherein the satellite sensors include sound sensors or acoustic wave sensors mounted on the outer surface of the vehicle.

9. The system of claim 4, wherein the accelerometers have a sensing range of about +/−120 g.

10. A crash sensor system for a vehicle that can operate in an autonomous mode, the vehicle having a front end, a rear end, a left side and a right side, the system comprising:
an electronic control nit (ECU) comprising:
a first accelerometer constructed and arranged to measure longitudinal acceleration of the vehicle during a severe impact event with the vehicle,
a second accelerometer constructed and arranged to measure lateral acceleration of the vehicle during a severe impact event with the vehicle, and
a processor circuit,
a brake controller electrically connected with the ECU, and
a steering controller electrically connected with the ECU,
wherein the ECU is constructed and arranged to trigger an occupant restraint system of the vehicle in the event of a severe impact event with the vehicle as detected by at least the first and second accelerometers, and
a plurality of satellite sensors electrically connected to the ECU and mounted at the front end, the rear end, the right side and the left side of the vehicle near or on an outer surface thereof to detect low severity impact event with the vehicle that does not cause activation of the occupant restraint system,
wherein the processor circuit is constructed and arranged to execute an algorithm to confirm, via data from the plurality of satellite sensors, whether the low severity impact event with the vehicle occurred, and
wherein, when the low severity impact event with the vehicle has been confirmed, the ECU is constructed and arranged to trigger the brake controller and the steering controller to cause the vehicle, while in the autonomous mode, to pull over and stop.

11. The system of claim 10, further comprising:
a first pressure tube sensor electrically connected to the ECU and mounted in a bumper at the front end of the vehicle, and
a second pressure tube sensor electrically connected to the ECU and mounted in a bumper at the rear end of the vehicle,
wherein the processor circuit is constructed and arranged to execute the algorithm to confirm, via data from the first and second pressure tube sensors, and the plurality of satellite sensors, if the low severity impact event with the vehicle occurred.

12. The system of claim 10, wherein the satellite sensors include accelerometers mounted on the outer surface of the vehicle.

13. The system of claim 10, wherein certain of the satellite sensors are accelerometers and other satellite sensors are pressure sensors.

14. The system of claim 13, wherein the accelerometers are disposed on the front end and on the rear end of the vehicle.

15. The system of claim 13, wherein the pressure sensors are disposed in cavities in at least the left side and the right side of the vehicle.

16. The system of claim 10, wherein the satellite sensors include sound sensors or acoustic wave sensors mounted on the outer surface of the vehicle.

17. The system of claim 12, wherein the accelerometers have a sensing range of about +/−120 g.

\* \* \* \* \*